United States Patent
MacLeod

(10) Patent No.: US 10,677,929 B2
(45) Date of Patent: Jun. 9, 2020

(54) METHOD AND APPARATUS FOR DETERMINING THE TIME OF ARRIVAL OF AN INCOMING SATELLITE SIGNAL

(71) Applicant: QINETIQ LIMITED, Farnborough (GB)

(72) Inventor: Malcolm David MacLeod, Worcestershire (GB)

(73) Assignee: QINETIQ LIMITED, Hampshire (GB)

(*) Notice: Subject to any disclaimer, the term of this patent is extended or adjusted under 35 U.S.C. 154(b) by 403 days.

(21) Appl. No.: 15/112,686

(22) PCT Filed: Jan. 26, 2015

(86) PCT No.: PCT/EP2015/051514
§ 371 (c)(1),
(2) Date: Jul. 19, 2016

(87) PCT Pub. No.: WO2015/110640
PCT Pub. Date: Jul. 30, 2015

(65) Prior Publication Data
US 2017/0003397 A1 Jan. 5, 2017

(30) Foreign Application Priority Data
Jan. 24, 2014 (GB) .................................. 1401237.1

(51) Int. Cl.
*G01S 19/30* (2010.01)
*G01S 19/37* (2010.01)

(52) U.S. Cl.
CPC .............. *G01S 19/30* (2013.01); *G01S 19/37* (2013.01)

(58) Field of Classification Search
CPC ................................. G01S 19/30; G01S 19/37
See application file for complete search history.

(56) References Cited

U.S. PATENT DOCUMENTS

| 6,081,691 A | 6/2000 | Renard et al. |
| 8,094,697 B2 * | 1/2012 | Ries ........................ G01S 19/37 |
| | | 375/130 |

(Continued)

FOREIGN PATENT DOCUMENTS

| EP | 0892277 A2 | 1/1999 |
| EP | 1143652 A2 | 10/2001 |

(Continued)

OTHER PUBLICATIONS

Kaplan et al., Understanding GPS Principles and Applications, 2006, Second Edition, pp. 153-164 (Year: 2006).*

(Continued)

*Primary Examiner* — Cassi J Galt
(74) *Attorney, Agent, or Firm* — Kenealy Vaidya LLP

(57) ABSTRACT

Some embodiments are directed to a method of determining the time of arrival of an incoming satellite signal at a receiver, including receiving an incoming signal, multiplying of the incoming signal by a first real-valued periodic modifying signal to produce a first modified output, correlating the first modified output to obtain a first correlation output, multiplying the incoming signal by a second real-valued periodic modifying signal to produce a second modified output, correlating the second modified output to produce a second correlation output and comparing the first correlation output with the second correlation output.

4 Claims, 10 Drawing Sheets

(56) References Cited

U.S. PATENT DOCUMENTS

| | | |
|---|---|---|
| 8,144,752 B2 | 3/2012 | Richard de Latour |
| 2005/0195789 A1 | 9/2005 | Akopian et al. |
| 2006/0097915 A1* | 5/2006 | Martin .................... G01S 19/30 342/357.59 |
| 2007/0211793 A1 | 9/2007 | Han |
| 2010/0104046 A1 | 4/2010 | Hodgart et al. |
| 2010/0124255 A1 | 5/2010 | Riley |

FOREIGN PATENT DOCUMENTS

| | | |
|---|---|---|
| EP | 1962101 A1 | 8/2008 |
| GB | 2506293 A | 3/2014 |
| JP | H11-513796 A | 11/1999 |
| JP | 2008-32737 A | 2/2008 |
| JP | 2010-515324 A | 5/2010 |
| JP | 2012-505412 A | 3/2012 |
| RU | 2155447 C1 | 8/2000 |
| RU | 2487823 C1 | 7/2013 |
| WO | WO9714977 A1 | 4/1997 |
| WO | 0161372 A1 | 8/2001 |
| WO | 0184745 A1 | 11/2001 |
| WO | 2004/031797 A1 | 4/2004 |
| WO | 2004031797 A1 | 4/2004 |
| WO | 2005/022186 A1 | 3/2005 |
| WO | 2010/042630 A1 | 4/2010 |
| WO | WO2010082635 A1 | 7/2010 |
| WO | 2014001323 A1 | 1/2014 |

OTHER PUBLICATIONS

Search Report under Section 17(5) issued in British Application No. 1401237.1.
International Search Report issued in International Application No. PCT/EP2015/051514.
Written Opinion of the International Searching Authority issued in International Application No. PCT/EP2015/051514.
Aug. 30, 2018 Office Action issued in corresponding Russian Application No. RU2016134259 (with English translation).
Aug. 30, 2018 Search Report issued in corresponding Russian Application No. RU2016134259 (with English translation).
Ali Albu-Rghaif, et al., "Galileo Signals Acquisition Using Enhanced Subcarrier Elimination Conversion and Faster Processing", pp. 1-5.
Hervé Guichon, et al., "Acquisition of BOC Signal in Presence of Multipath", Test results and advances. 10.1109/NIAVITEC.2010. 5708000.; 2010 IEEE, pp. 1-8.
Vincent Heiries, et al., "Analysis of Non Ambiguous BOC Signal Acquisition Performance", (2004) In: ION 2004, Sep. 21-24, 2004, Long Beach, United States, pp. 1-12.

* cited by examiner

METHOD AND APPARATUS FOR DETERMINING THE TIME OF ARRIVAL OF AN INCOMING SATELLITE SIGNAL

CROSS REFERENCE TO RELATED APPLICATION

This application is a National Phase filing under 35 C.F.R. § 371 of and claims priority to PCT Patent Application No.: PCT/EP2015/051514, filed on Jan. 26, 2015, which claims the priority benefit under 35 U.S.C. § 119 of British Application No.: 1401237.1, filed on Jan. 24, 2014, the contents of which are hereby incorporated in their entireties by reference.

BACKGROUND

This invention relates to improved satellite positioning methods and in particular to improved methods of determining the distance between a satellite and receiver. Satellite positioning systems, such as GNSS, are used to determine accurately the position of a receiver on the earth. This requires an accurate knowledge of the distance between a satellite and the receiver. In order to calculate this distance, the exact time taken for a signal to travel from the satellite to the receiver is required. This is achieved by including in the signal an indication of the exact time that the signal left the satellite. Then, by determining the exact time the signal arrived at the receiver, the time the signal took to travel from the satellite to the receiver can be calculated.

For the receiver to determine the time of arrival of the signal, it must first capture the signal. For this purpose, the signal may contain a section of code known as ranging code. The ranging code is known by the receiver. The receiver performs processing operations on the signal in an attempt to identify the ranging code. Once the ranging code has been identified, the receiver "locks on" to the signal and reads the other information contained in the signal. Locking on to the signal for the first time is known as "acquisition". Once acquisition has been achieved, it is desirable for the receiver to stay in contact with the satellite. Due to relative movement between the satellite and the receiver, the separation of satellite and receiver is constantly changing and needs to be determined. The process of remaining locked on to the signal is known as tracking.

In known systems, the low signal-to-noise ratio at the antenna of the receiver means that in order to identify the ranging code it is normally necessary to perform a correlation operation on the signal. This involves repeatedly measuring the amplitude of the signal over a period of time, normally at constant time intervals. The measured amplitude at a particular time is multiplied by the amplitude of the known ranging code at the corresponding time. The results of these multiplication operations are then summed. The process is then repeated numerous times. Each time the process is repeated, the sampling operation is delayed slightly relative to the previous sampling operation. When the amplitude summation noted above becomes very large, a good match between the incoming signal and the correlation reference data has been found. The time delay applied by the correlator is then measured. In this way a coarse estimate of the time of arrival of the signal at the receiver can be obtained. However, it is desired to provide a more accurate determination of the arrival time, so that the separation of the receiver and satellite can be more accurately determined. This is particularly important during the tracking stage.

One type of signal transmitted by GNSS satellites is known as Binary Phase Shift Keying (BPSK). In BPSK signals the ranging code information is modulated onto the signal as a sequence of square pulses (chips). The present invention is intended for the reception of another type of signal transmitted by GNSS satellites which is known as Binary Offset Carrier (BOC). In BOC signals a BPSK signal containing the ranging code information is first multiplied by a sub-carrier waveform of higher frequency than the BPSK chip rate before being modulated onto the signal. The subcarrier waveform is a square wave whose frequency is the sub-carrier frequency.

One known way of locking on to a BOC satellite signal is by inputting the received BOC signal into a correlator and using the BOC signal itself (which is known by the receiver) as the correlation reference signal. Using this approach, the variation of correlator output with time has the form of a series of narrow peaks of progressively increasing height until a maximum peak is reached, followed by a series of narrow peaks of progressively decreasing height. This method has the disadvantage that it is costly to perform sampling operations with a sufficiently small time-step that the maximum peak is reliably identified.

An alternative way of locking on to the signal is to only perform correlation on the components of the BOC signal which lie in one or other of the two frequency bands in which its energy is concentrated, known as "sidebands". The centre of the upper sideband is displaced in frequency from the centre of the entire BOC signal by an amount equal to the frequency of the original sub-carrier signal. The centre of the lower sideband is displaced in frequency from the centre from of the entire BOC signal by an amount equal to the negative of the frequency of the original sub-carrier signal. Extraction of only the upper sideband of the BOC signal can be achieved with a Digital Down Converter (DDC). This results in a signal for input to the correlator that is similar to a BPSK signal and the BPSK form of the ranging code is used as the correlator reference signal. Using this method, which is called a "single sideband" method, the correlator output has the same form as it does for a BPSK signal; it increases linearly to a peak and then decreases linearly. The time of the exact peak of the correlation output is harder to estimate accurately using this method. As a result, the estimate of signal arrival time obtainable using this method is fairly rough.

Other known methods involve modifying the incoming signal and processing the resulting modified signal in an attempt to extract information about the time delay between the incoming signal and the modifying signal, and thereby obtain an improved arrival time estimate. Such methods are complicated and require relatively large processing power and so are expensive.

SUMMARY

An alternative method for accurately determining the arrival time of the signal has now been devised.

According to a first aspect of the invention there is provided a method of determining the time of arrival of an incoming satellite signal at a receiver, the method comprising: receiving an incoming signal, multiplying the incoming signal by a first real-valued periodic modifying signal to produce a first modified output, correlating the first modified output to obtain a first correlation output, multiplying the incoming signal by a second real-valued periodic modifying signal to produce a second modified output, correlating the second modified output to produce a second correlation output and comparing the first correlation output with the second correlation output.

This method is advantageous because comparing the first and second correlation outputs enables an accurate estimate of the arrival time of the signal to be obtained using less processing power than known methods. In particular, multiplying by a real-valued signal is less complicated and costly than multiplying by a complex valued signal.

The step of comparing the first and second correlation outputs may comprise calculating the ratio of the first and second correlation outputs and may comprise calculating the arctan of an angle proportional to the ratio of the first and second correlation outputs.

The step of multiplying a first portion of the incoming signal by a first real-valued periodic modifying signal and/or the step of multiplying a second portion of the incoming signal by a second real-valued periodic modifying signal comprise applying a bit stream to the first and/or second portions of the incoming signal respectively. The bit stream may comprise a plurality of bits, each bit having the value of either +1 or −1. Benefits of this are that the method can be performed using simple apparatus and only low processing power is required.

The first and/or second correlation outputs may vary sinusoidally with the time delay between the incoming signal and the first and/or second modifying signal respectively.

The incoming signal may contain an identifier signal. The step of correlating the first and second modified outputs may comprise using a correlation reference signal that has the same form as the identifier signal. The identifier signal may comprise ranging code. The incoming signal may comprise a subcarrier signal modulated with the identifier signal. The subcarrier signal may be periodic and may be of higher frequency than the identifier signal. The subcarrier signal may generally have the form of a square wave. The identifier signal may comprise a BPSK signal. The incoming signal may be a BOC signal. The received incoming signal may be demodulated before being multiplied by the first and second real-valued periodic multiplying signals.

The first real-valued modifying signal may have a known relationship to the second real-valued modifying signal. The first real-valued modifying signal may be similar in form to the second real-valued modifying signal. There may be a pre-determined time delay between the first and second modifying signal. The first modifying signal may be sine-phased. The second modifying signal may be cosine-phased. The first and/or second modifying signal may have a similar or substantially equal frequency to a component signal of the incoming signal. The component of the incoming signal may be the subcarrier signal.

The first and second periodic modifying signals may be real-valued binary (two-valued) or ternary (three-valued) signals. This may make the multiplication operations simple to implement, with resulting low power consumption. A further advantage of the present invention is that, during the correlation operation, it is not necessary to identify the time delay of the peak value of the correlation accurately. Values of the first and second correlator outputs located away from the peak have the same relative dependence on the arrival time of the incoming signal relative to the modifying signals; for example, the ratio between the first and second correlator outputs is substantially the same away from the peak as it is at the peak.

The incoming signal may be multiplied by the first modifying signal and the second modifying signal substantially simultaneously. The steps of correlating the first modified output and correlating the second modified output may be performed substantially simultaneously.

The present method may be for use in GNSS satellite positioning systems.

According to a further aspect of the invention there is provided an apparatus for determining the time of arrival of a signal at a receiver, a receiver for receiving an incoming signal, a first multiplier for multiplying the incoming signal by a first real-valued periodic signal, a first correlator arranged to correlate the output of the first multiplier, a second multiplier for multiplying the incoming signal by a second real-valued periodic signal, a second correlator arranged to correlate the output of the second multiplier, and means for comparing the respective outputs of the first and second correlators.

The apparatus may be adapted to perform the method of the first aspect of the invention. The first and second multiplier may be adapted such that the first and/or second real-valued periodic signals are binary (two-valued) or ternary (three-valued) signals. The first and second multipliers may be located in the same unit.

The first multiplier may be adapted such that the first real-valued periodic signal is cosine-phased. The second multiplier may be adapted such that the second periodic signal is sine-phased. The means for comparing the correlator outputs may be adapted to produce an output indicative of the time delay between the incoming signal and the real-valued periodic signals.

The apparatus may be arranged such that, in use, the signal that is output from the demodulator is applied to the inputs of the first and second multipliers. The first and/or second correlators may use a BPSK signal as a correlator reference signal. The means for comparing may comprise a calculator arranged adapted to calculate the ratio of the first and second correlator outputs. The calculator may be adapted to calculate the arctan of an angle proportional to the ratio of the first and second correlator outputs.

BRIEF DESCRIPTION OF THE DRAWINGS

A presently preferred embodiment of the invention will now be described in detail, for illustration only, with reference to the accompanying drawings, in which.

DETAILED DESCRIPTION OF EXEMPLARY EMBODIMENTS

The invention concerns improvements to the GNSS satellite positioning system. As noted above, systems such as GNSS require the accurate determination of the position of a receiver on earth. In order to achieve this, the time of arrival of a satellite signal at the receiver must be determined accurately. The signal sent by the satellite contains information including the time of transmission of the signal from the satellite. Some signals transmitted by satellites are BPSK signals in which the information is BPSK modulated onto a sequence of square pulses (chips). The resulting BPSK signal comprises a repeating pattern of chips. A portion of the repeating pattern is known by the receiver. This known portion of each pattern of chips is used by the receiver to identify and track the signal.

Figure 1:
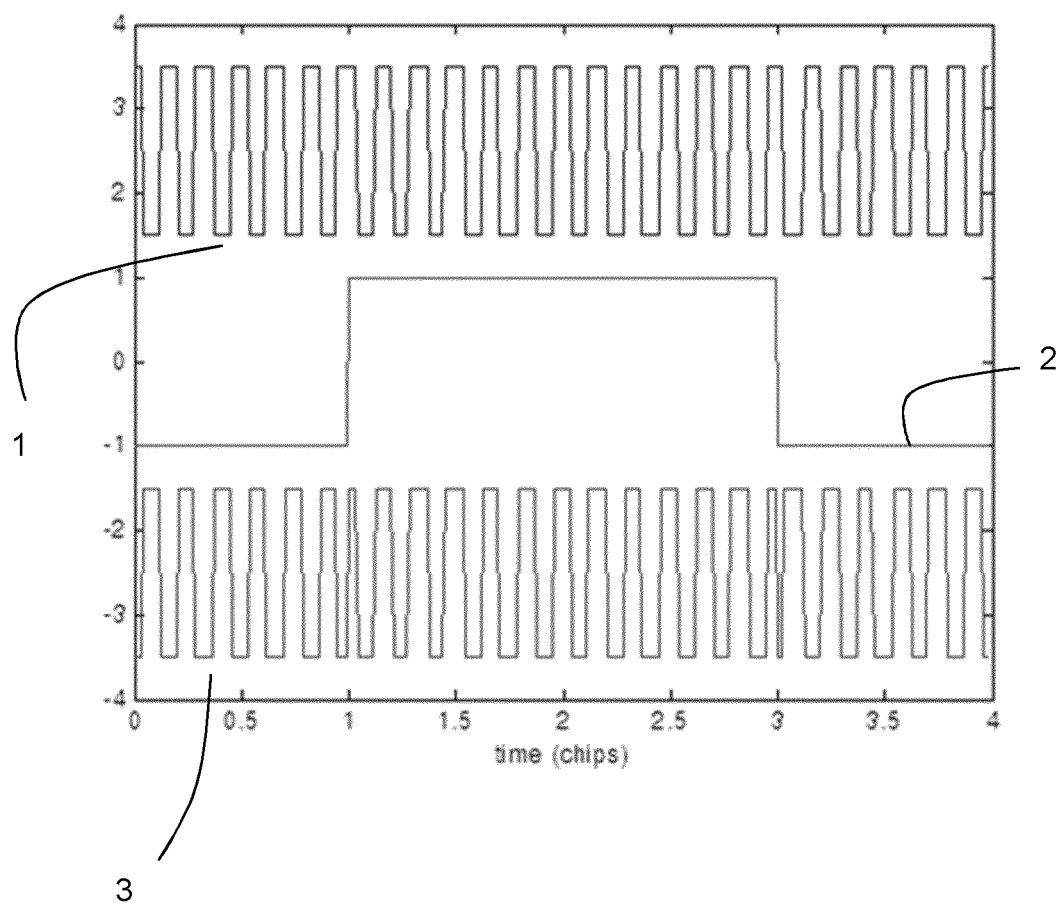
FIG. 1 is a plot of a typical BOC signal and its constituent signals.

Other signals transmitted by satellites are BOC signals in which the BPSK signal is multiplied by a "sub-carrier" signal prior to transmission. In "BOC modulation" the sub carrier signal is a substantially square wave of higher frequency than the BPSK chip rate. This multiplication operation results in a BOC signal. The BOC signal is used to modulate a radio frequency carrier signal. This RF signal is transmitted by the satellite. FIG. 1 shows a typical BOC signal 3 and its constituent signals: the subcarrier 1 and the BPSK signal 2.

As noted above, the BPSK signal comprises chips. Each chip has the value +1 or −1. Consider the BOC signal represented by the lower trace of FIG. 1. This BOC signal has 3 portions. The first portion is the sub carrier signal modulated by a BPSK chip with the value −1. This is followed by the second portion which is the sub carrier signal modulated by a BPSK chip with the value +1. This is followed by the second portion which is the sub carrier signal modulated by a BPSK chip with the value −1.

Figure 2:
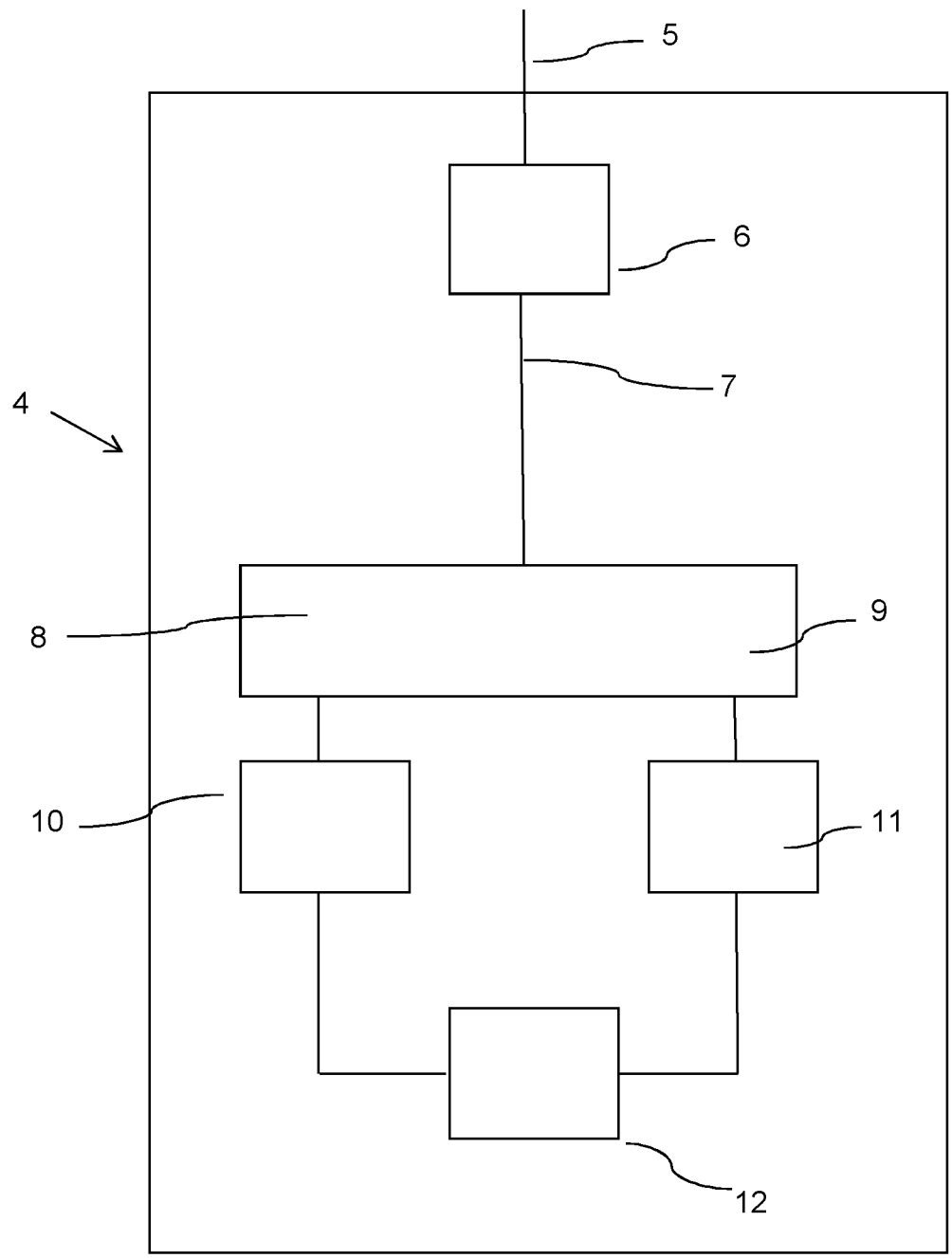
FIG. 2 is a schematic drawing of the apparatus of the invention.
Figure 3:
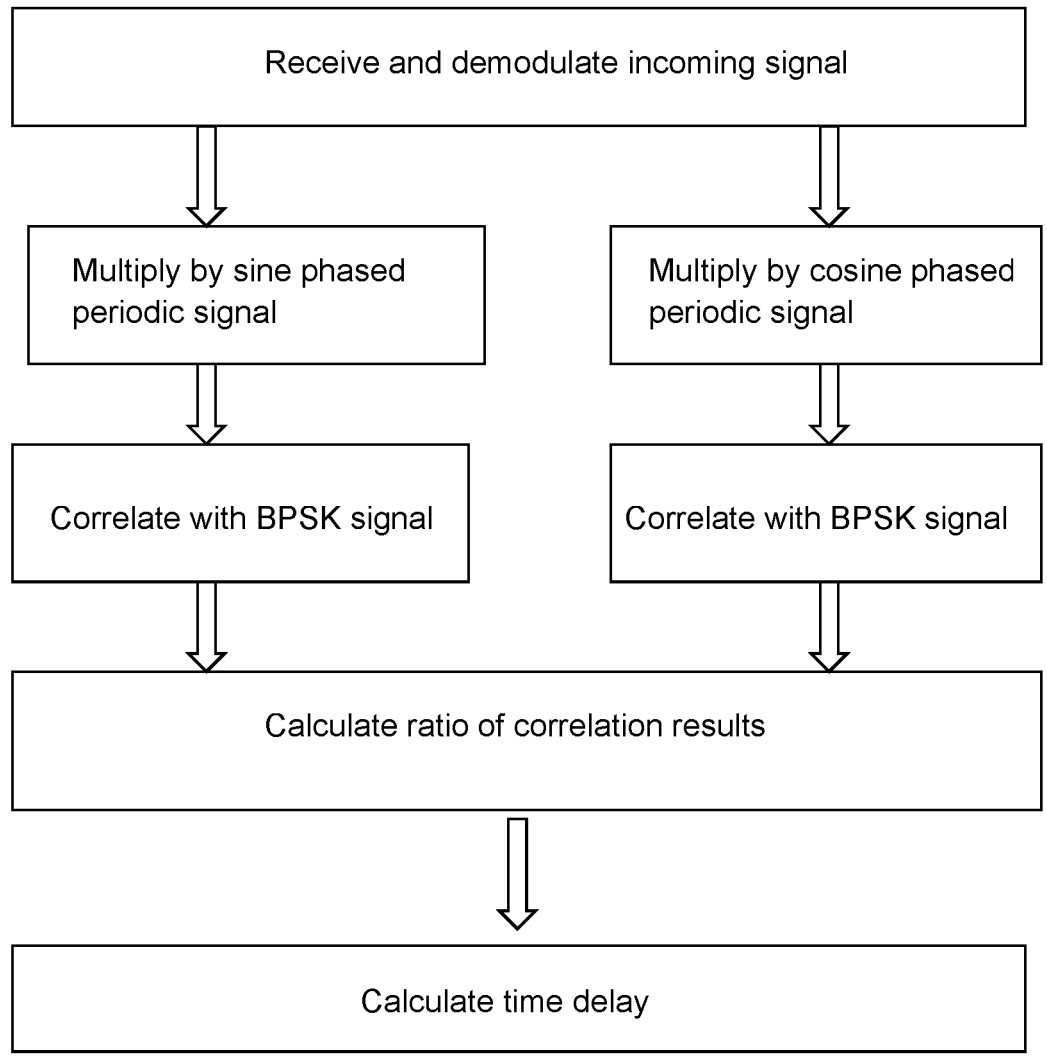
FIG. 3 shows a flow diagram of the method steps performed by the apparatus according to the invention.

The receiver is shown schematically in FIG. 2. The receiver, shown generally as 4, receives the RF carrier signal through an antenna 5. A demodulation operation is then performed by a demodulator 6 which results in a signal similar to the original transmitted BOC signal which shall be referred to from here onward as "the BOC signal". A multiplier 8 multiplies the signal 7 by a real-valued cosine-phased periodic function, having the same or a similar frequency to the frequency of the subcarrier signal, to produce a first output signal. This output signal shall be referred to here as the cosine output. Simultaneously, a multiplier 9 multiplies the signal 7 by a real valued sine-phased periodic function, having the same or a similar frequency to the frequency of the subcarrier signal, to produce a second output signal. This output signal shall be referred to here as the sine output. The variation with time of each of the cosine and sine outputs depends on the time delay between the BOC signal and the real-valued cosine-phased and sine-phased periodic functions, ie the position in time of the peaks and troughs of the periodic function relative to that of the peaks and troughs of the BOC signal. The cosine output is applied to a first correlator 10. Simultaneously, the sine output is applied to a second correlator 11.

The first and second correlators 10, 11 are conventional correlators, ie their purpose is to find the location in time of a known portion of the signal, despite the fact that there may be a low signal-to-noise ratio. Each of the first and second correlators 10, 11 uses the original BPSK signal as a reference signal. Each of the first and second correlators 10, 11 measures the amplitude of an input signal at time intervals during one of the repeating chip patterns. Each measured amplitude is multiplied by the amplitude, at corresponding time intervals, of the reference signal against which the input signal is being compared. The results of the multiplications are then summed. The size of the sum gives an indication of how closely the input signal matches the reference signal. This process of measuring and summing can be repeated on a subsequent one of the repeating chip patterns, with the measurements being made at points in time that are offset from the corresponding points in time at which the previous set of measurements were made. In this way the correlation process searches along the repeating chip pattern for the known portion.

Figure 4:
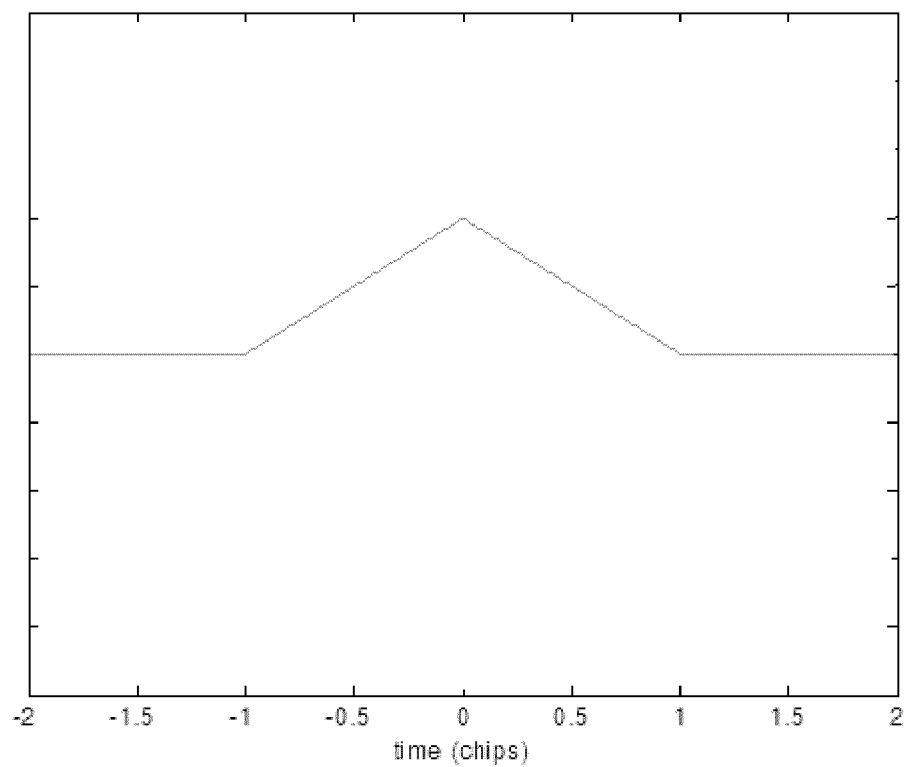
FIG. 4 is a plot of correlation amplitude against time offset for a typical BPSK signal.

If the summation at a particular time offset is a larger value than the summation at the previous time offset, then the process is moving closer to the known portion. Repeating the correlation process will produce a progressively larger value for the summation until the peak value for the summation is reached. Reaching the peak value means that the summation is being performed at the time offset closest to the known portion. Performing correlation at still greater time offsets will produce a lower value for the summation, as the process is "moving past" the known portion. To give an example, correlating a BPSK signal using the same signal as the reference signal in the correlator gives a "triangular" shaped peak in correlation output as a function of time delay, such as that shown in FIG. 4.

As noted above, in the present invention, the BOC signal is multiplied by a real-valued periodic signal. Consider FIG. 8 which shows three traces. The upper trace represents the real-valued periodic signal. The middle trace represents the incoming BOC signal of FIG. 1, ie the original subcarrier signal multiplied by the BPSK signal. For clarity, the BPSK signal which generated the BOC signal is shown in a dotted line superimposed on the BOC signal in FIG. 8. The BOC signal has three distinct portions. The first portion, approximately between t=0 and t=1, results from the subcarrier signal being multiplied by a portion of the BPSK signal having a value of +1. The second portion, approximately between t=1 and t=2, results from the subcarrier signal being multiplied by a portion of the BPSK signal having a value of −1. The third portion, approximately between t=2 and t=3, results from the subcarrier signal being multiplied by a portion of the BPSK signal having a value of +1. The lower trace shows the result of the multiplication between the periodic signal (the upper trace) and the incoming BOC signal (the middle trace).

The time delay between the periodic signal and the BOC signal is such that the peaks of the first and third portions of the BOC signal are approximately aligned in time with the peaks of the periodic signal. Furthermore, the peaks of the second portion of the BOC signal are approximately aligned in time with the troughs of the periodic signal. This means that multiplying the BOC signal by the periodic signal produces the lower trace of FIG. 8. This lower trace is similar in form to the BPSK signal (the dotted line superimposed over the middle trace). As the correlator uses the BPSK signal as a reference signal, passing the lower trace through the correlator produces a large positive result.

Figure 8:
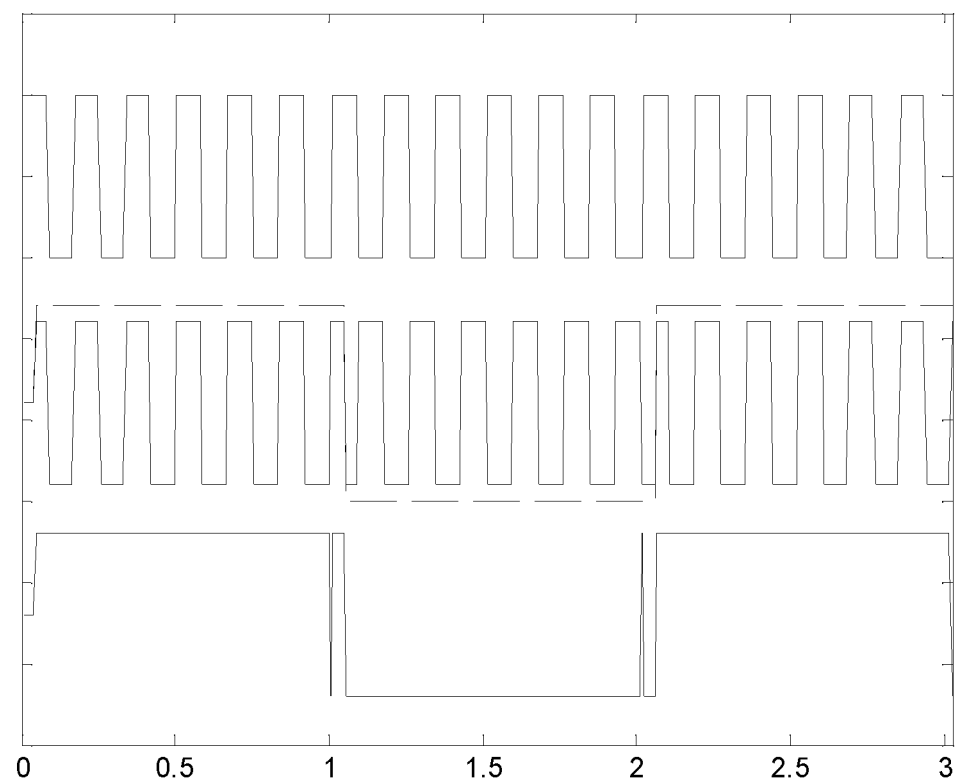
FIGS. 8-10 show the result of the multiplication of the BOC signal with the periodic function at three different time delays between the BOC signal and the periodic function.
Figure 9:
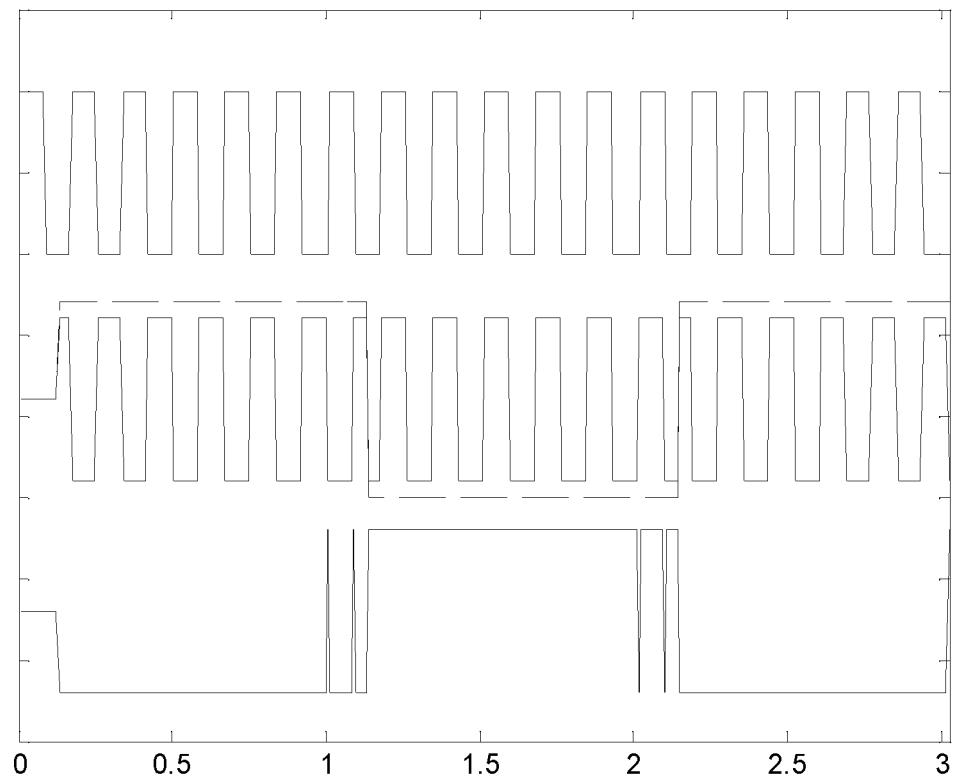
Figure 10:
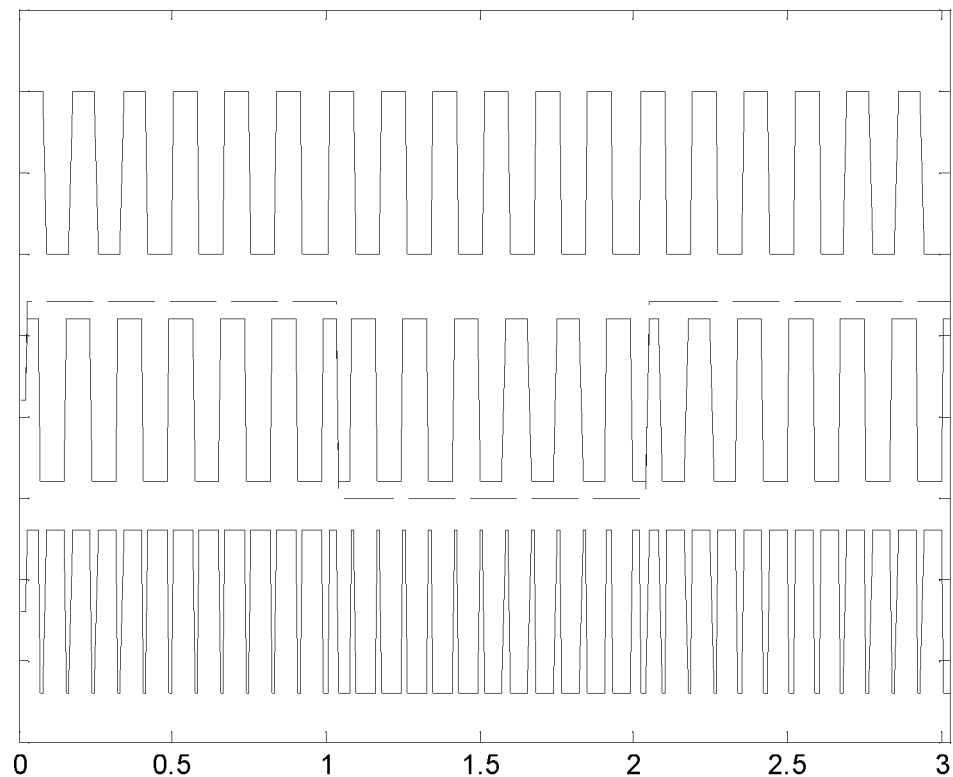

FIGS. 9 and 10 show the same 3 traces as FIG. 8, however, the time delay between the periodic signal and the incoming BOC signal in FIGS. 9 and 10 are different from FIG. 8 and from each other. In FIG. 9, the time delay is such that the peaks of the first and third portions of the BOC signal are approximately aligned in time with the troughs of the periodic signal. Furthermore, the peaks of the second portion of the BOC signal are approximately aligned in time with the peaks of the periodic signal. This means that multiplying the BOC signal by the periodic signal produces the lower trace of FIG. 9. This lower trace has the approximately the opposite form to the BPSK signal (the dotted line superimposed over the middle trace). As the correlator uses the BPSK signal as a reference signal, passing the lower trace through the correlator produces a large negative result.

In FIG. 10, the time delay between the periodic signal and the BOC signal is such that the peaks of the first and third portions of the BOC signal are slightly offset in time from the peaks of the periodic signal. Furthermore, the peaks of the second portion of the BOC signal are slightly offset in time from the troughs of the periodic signal. This means that multiplying the BOC signal by the periodic signal produces the lower trace of FIG. 10. This lower trace of FIG. 10 has three portions. In the first portion, approximately between t=0 and t=1, the value +1 occurs more often than the value −1. We may say that the value +1 occurs X % of the time, where X is greater than 50. In the second portion, approximately between t=1 and t=2, the value −1 occurs X % of the time, and therefore more often than the value +1. The third portion has the same form as the first portion. As the correlator uses the BPSK signal as a reference signal, passing the lower trace through the correlator produces a positive result. However, the magnitude of the result is lower than that of FIG. 8; in fact it is X % of the magnitude in FIG. 8.

It can therefore be seen that the size of the correlation output is dependent on the time delay between the BOC signal and the periodic signal. The present invention exploits this dependence to determine the time delay between the BOC signal and the periodic signal and hence determine accurately the arrival time of the BOC signal at the receiver. The peak correlation output varies with time delay between the incoming BOC signal and the real-valued periodic function.

Figure 5:
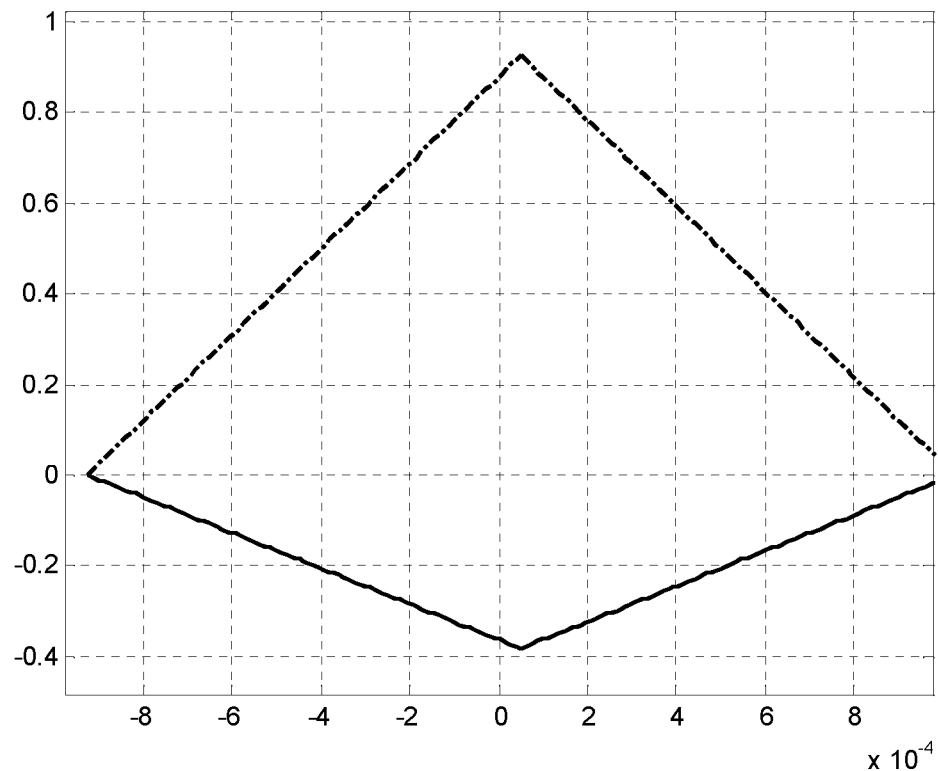
FIG. 5 is a plot of correlation amplitude against time offset for incoming signals that have been multiplied by cosine and sine phased periodic signals.

As noted above, in the method of our invention, a portion of the incoming BOC signal is multiplied by a cosine-phased periodic function and the same portion of the BOC signal is multiplied by the sine-phased periodic function. Correlating each output will produce a different result. This is because the peaks and troughs of sine-phased signals are offset from those of cosine-phased signals and so the two multiplication operations will produce different results. FIG. 5 shows the correlator output for a BOC signal multiplied by a cosine-phased periodic function (lower trace) and that for a BOC signal multiplied by a sine-phased periodic function (upper trace).

Figure 6:
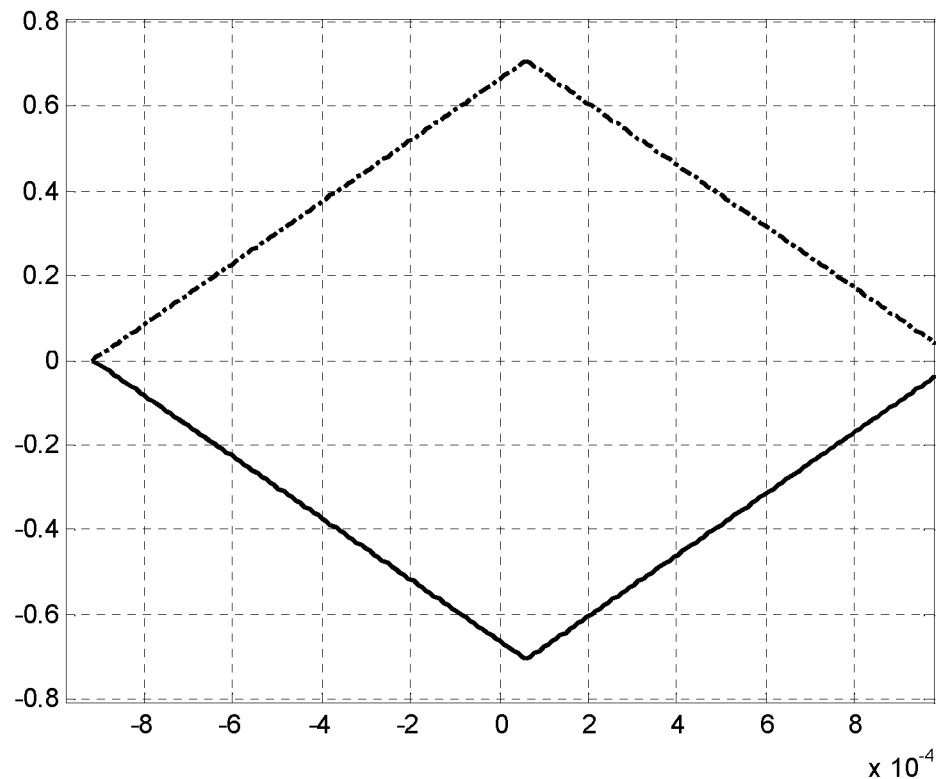
FIG. 6 shows the plot of FIG. 5, with a different time delay between the incoming signal and the applied periodic signals.

Both of the correlator outputs vary with time delay between the incoming BOC signal and the respective periodic signal. This is illustrated in FIG. 6 which shows the output of the correlators for the case in which a signal arrives at a time 1/16 of a sub-carrier period later than in FIG. 5. The lower plot shows the results of the first correlator 10 and the upper plot shows the results of the second correlator 11. As the lines in the plots shown in FIGS. 5 and 6 are straight lines, the ratio of the magnitudes of the upper and lower plots is independent of position on the horizontal axis. The time delay of the incoming signal relative to the periodic signals is calculated using the ratio of the magnitudes of the upper and lower plots. This time delay can therefore be calculated accurately using the sine and cosine correlation outputs even if those outputs are away from the correlation peak. It is not necessary to find the exact correlation peak.

Figure 7:
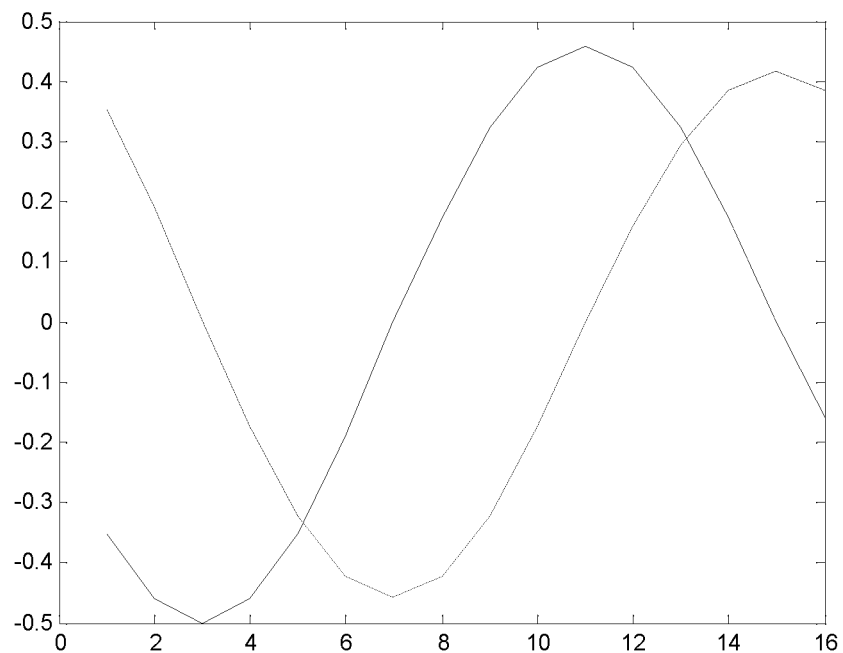
FIG. 7 shows a schematic plot of how the correlation amplitude varies with time delay between the incoming BOC signal and the applied periodic signal.

FIG. 7 shows how peak correlation outputs vary with time delay between the incoming signal and the applied periodic signals. One of the curves shows the peak correlation output using the cosine phased periodic function, the other shows the peak correlation output using the sine phased periodic function. It can be seen that both curves have a substantially sinusoidal dependence on delay. As the real-valued sine and cosine-phased signal have a known relationship to one another, comparing the values of the correlator outputs enables the time delay to be calculated. In particular, the time delay is proportional to the arctan of the ratio between the first and second correlator outputs.

The invention claimed is:

1. A method of determining a time delay of an incoming satellite Binary Offset Carrier (BOC) signal at a receiver relative to a first and second periodic signal, the BOC signal including a Binary Phase Shift Keyed (BPSK) signal multiplied by a sub-carrier signal, the method comprising: receiving in the receiver an incoming BOC signal, multiplying in a first multiplier the incoming signal by a first real-valued periodic modifying signal to produce a first modified output, correlating in a correlator the first modified output to obtain a first correlation output, multiplying in a second multiplier the incoming signal by a second real-valued periodic modifying signal to produce a second modified output, correlating in a correlator the second modified output to produce a second correlation output and comparing in a calculator the first correlation output with the second correlation output by calculating a ratio of magnitudes of the first and second correlator outputs; and calculating in the calculator the time delay of the incoming signal relative to the periodic signals using the ratio; wherein the correlation of the first and second modified outputs is done with a correlation reference signal that has the same form as a BPSK identifier signal including a ranging code that is contained within the incoming satellite signal; and wherein the first and second real-valued periodic modifying signals are sine and cosine-phased respectively, are binary valued, and have the same frequency to the BOC sub-carrier signal; and further wherein binary nature of the periodic modifying signals provides the time delay of the incoming signal that is directly proportional to the ratio of the magnitudes of the first and second correlator outputs.

2. The method as claimed in claim 1, wherein the method is for use in a Global Navigation Satellite System (GNSS) satellite navigation system.

3. The method as claimed in claim 1, wherein the incoming signal is multiplied by the first modifying signal and the second modifying signal simultaneously.

4. An apparatus for determining a time delay relative to a first and second periodic signal of a BOC signal at a receiver, the BOC signal including a BPSK signal multiplied by a sub-carrier signal, the receiver being configured for receiving an incoming BOC signal, the apparatus comprising:
    a first multiplier configured for multiplying the incoming signal by a first real-valued periodic signal,
    a first correlator arranged to correlate the output of the first multiplier,
    a second multiplier configured for multiplying the incoming signal by a second real-valued periodic signal,
    a second correlator arranged to correlate the output of the second multiplier, and
    a calculator for comparing the respective outputs of the first and second correlators by calculating a ratio of magnitudes of the first and second correlator outputs; and calculating in the calculator the time delay of the incoming signal relative to the periodic signals using the ratio wherein the time delay of the incoming signal is directly proportional to the ratio; wherein the first and second correlators use a correlation reference signal that has the same form as a BPSK identifier signal, including a ranging code, that is contained within the incoming signal, and wherein the first and second real-valued periodic modifying signals are sine and cosine-phased respectively, are binary valued, and have the same frequency to the BOC sub-carrier signal; and further wherein binary nature of the periodic modifying signals provides the time delay of the incoming signal that is directly proportional to the ratio of the magnitudes of the first and second correlator outputs.

* * * * *